US007016956B2

(12) United States Patent
Dobbins et al.

(10) Patent No.: US 7,016,956 B2
(45) Date of Patent: Mar. 21, 2006

(54) DIRECTORY-ENABLED INTELLIGENT BROADBAND SERVICE SWITCH

(75) Inventors: Kurt A. Dobbins, Bedford, NH (US); David J. Ruffen, Salem, NH (US); Brett A. Miller, Northborough, MA (US); Bruce E. Caram, Hudson, MA (US)

(73) Assignee: Ellacoya Networks, Inc., Merrimack, NH (US)

( * ) Notice: Subject to any disclaimer, the term of this patent is extended or adjusted under 35 U.S.C. 154(b) by 817 days.

(21) Appl. No.: 09/917,866

(22) Filed: Jul. 31, 2001

(65) Prior Publication Data

US 2002/0029260 A1 Mar. 7, 2002

Related U.S. Application Data

(60) Provisional application No. 60/222,038, filed on Jul. 31, 2000.

(51) Int. Cl.
*G06F 15/173* (2006.01)

(52) U.S. Cl. ...................... 709/224; 709/219; 709/225; 709/230

(58) Field of Classification Search ................ 709/219, 709/225, 224, 230; 370/468, 395.21, 395.43
See application file for complete search history.

(56) References Cited

U.S. PATENT DOCUMENTS 6,681,232 B1 * 1/2004 Sistanizadeh et al. .... 707/104.1
6,728,267 B1 * 4/2004 Giese et al. ................ 370/469
2004/0060055 A1 * 3/2004 Kukura et al. .............. 719/316

OTHER PUBLICATIONS

1999. "Subscriber Policy Manager (SPM)." Shasta Networks, www.shastanets.com.
1999. "Subscriber Service Gateway (SSG)." Shasta Networks, www.shastanets.com.
1999. "Subscriber Service System (SSS)." Shasta Networks, www. shastanets.com.
2001. "Cisco Service Selection Gateway." Cisco Systems, Inc., www.cisco.com, pp. 1-3.
Nov. 2002, "Cisco Subscriber Edge Services Manager." Cisco Systems, Inc., www.cisco.com, pp. 1-5.
"Service Selection Gateway." Cisco IOS Release 12.2(11)T, pp. 1-122.

* cited by examiner

*Primary Examiner*—Frantz B. Jean
(74) *Attorney, Agent, or Firm*—Wilmer Cutler Pickering Hale and Dorr LLP

(57) ABSTRACT

Tailored application or service may be delivered via a communication device to a number of subscribers in a manner that avoids having to store individual copies of a service profile on the device for each subscriber receiving the application or service. Specifically, a packet is received requesting delivery of the application or service from the subscriber at a communication device. In response, the communication device retrieves a subscriber context, which references policies that describe each of the applications and services available to the subscriber. The application or service requested by the packet is compared with the policies referenced by the subscriber context to identify any matching policies. Subsequently, the requested application or service is delivered to the subscriber via the communication device according to the matching policies as described by a service profile. This service profile is accessible for describing the application or service when requested by other subscribers. In addition, in some cases each application or service is described by a single set of polices in the service profile. In these instances, each request for the application or service is fulfilled according to that single set of policies.

10 Claims, 11 Drawing Sheets

DIRECTORY-ENABLED INTELLIGENT BROADBAND SERVICE SWITCH

CROSS REFERENCE TO RELATED APPLICATION

This application claims the benefit of U.S. Provisional Application No. 60/222,038, filed Jul. 31, 2000, incorporated herein by reference in its entirety.

FIELD OF THE INVENTION

The present invention relates generally to devices and methods for switching, servicing and steering of services and application data traffic on a data communication network. More particularly, the present invention relates to a data communication device and associated processes capable of delivering, to a subscriber, services or applications described in service profiles that are accessible for describing requests by any number of other subscribers.

BACKGROUND OF THE INVENTION

The recent improvements in public broadband or high-speed networks technology has brought about many changes in the infrastructure required to deliver services and applications. Among other things, these broadband networks have greatly increased the bandwidth available to network service customers and enabled a multitude of new networked-based applications and services. For example, varying levels of service or functionality may now be provisioned to subscribers based on the individual subscriber's needs.

Customers of these network service providers, including for example both residential and business customers, connect to these broadband networks with each customer having its own set of requirements from the network service. In these situations, provisioning the appropriate services and controlling access and quality of service to the applications and services are critical to the ability of the network service provider to add value and retain their subscribers.

Generally speaking, a service provider may be capable of providing a number of levels of service to its subscribers. For example, one service provider may possess the capability to provide varying levels of bandwidth to its subscribers, at incremental billing rates. Thus, a subscriber could obtain a relatively lower or basic level of bandwidth at a lower cost, or intermediate or higher levels at incrementally greater costs. Likewise, a particular application, such as for example, a word processing or a computer-aided drafting application may be offered by an application provider with varying degrees of service. In these situations, a subscriber could pay a lower fee for a basic version (or lower level of functionality) or higher fees for access to a premium version. In this manner, subscribers can be charged only for the services and applications actually utilized.

In order to provision these varying levels of applications or services, traditional communication devices, such as data switches and routers, had to be configured (i.e., identifying and entering the services and/or applications available to a subscriber) statically. Specifically, information relating to each service subscriber (e.g., which services or applications as well as the particular level of service accessible by the subscriber) was not only entered manually by a technician into the communication device, but was also stored individually. In other words, all of the policies for each subscriber had to be stored individually in the device. Thus, these techniques were extremely configuration-intensive and costly to support.

Each service or application is defined by a number of polices. These policies define each of the requirements necessary to provision the service or application, and include, for example, a quality of service, a rate ceiling, etc. In order to adequately provision a service or application to a subscriber base, each communication device requires knowledge of the policies of each subscriber. Thus, in order to provision services or applications to a subscriber base, it was necessary to store, locally on each device, a listing of each of the policies for each of the services or applications available to each subscriber of the subscriber base, even with subscribers accessing the same service or application. Therefore, multiple copies of the policies for a service or application were stored even if they were identical for each subscriber. Obviously, with large numbers of services, applications or subscribers, enormous amounts of memory would be required.

As such, it is apparent that these communication devices do not possess the capability to dynamically provision tailored services and applications to large subscriber bases. Accordingly, increasingly efficient devices and techniques for provisioning tailored services and applications are needed.

SUMMARY OF THE INVENTION

The present invention addresses the problems described above by implementing, on a communication device, a service profile utilizable for describing applications or services requested by any number of subscribers. More particularly, tailored applications or services may be delivered via a communication device to a number of subscribers in a manner that avoids having to store multiple copies of a service profile on the device. Specifically, a packet is received requesting delivery of the application or service from the subscriber at a communication device. In response, the communication device retrieves a subscriber context, which references policies that describe each of the applications and services available to the subscriber. The application or service requested by the packet is compared with the policies referenced by the subscriber context to identify any matching policies. Subsequently, the requested application or service is delivered from a service provider to the subscriber via the communication device according to the matching policies as described by a service profile. This service profile is accessible for describing the application or service when requested by other subscribers. In addition, in some cases each application or service is described by a single set of polices in the service profile. In these instances, each request for the application or service is fulfilled according to that single set of policies.

Thus, the communication device of the present invention requires knowledge of only a single set of policies (or service profile) for each service or application. To provision a particular service or application to a number of subscribers, it is necessary only to reference the service profile, which describes the service or application for all authorized subscribers. Accordingly, tailored services and applications may be dynamically delivered to large subscriber bases with an efficient utilization of communication device resources.

BRIEF DESCRIPTION OF THE DRAWINGS

Various objects, features, and advantages of the present invention can be more fully appreciated as the same become better understood with reference to the following detailed description of the present invention when considered in connection with the accompanying drawings, in which.

DETAILED DESCRIPTION OF THE INVENTION

Figure 1:
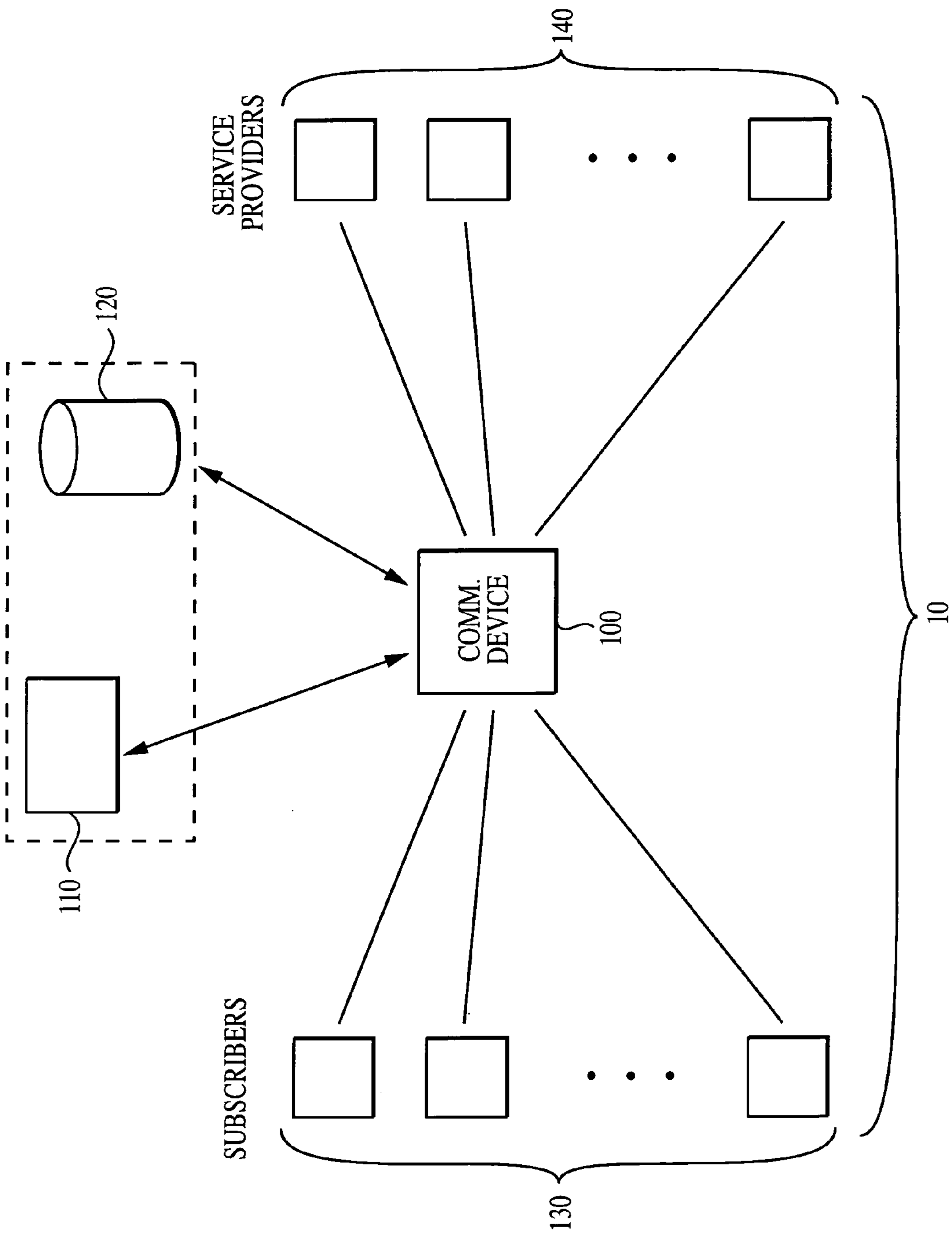
FIG. 1 illustrates one example of a data communication network utilizable for implementing concepts of at least some embodiments of the present invention.

FIG. 1 illustrates one example of a data communication network 10 utilizable for implementing concepts of at least some embodiments of the present invention. More particularly, data communication network 10 includes a communication device 100 interconnected with an authentication server 110, database 120, a number of subscribers 130, and a number of service or application providers 140.

Generally speaking, communication device 100 may be utilized to determine access privileges to network and application services by dynamically identifying subscribers and establishing, maintaining, and changing connections (logical and physical) between any number of other components of communication network 10. Thus, once a subscriber has been identified, at least some embodiments of the present invention contemplate utilizing communication device 100 to deliver or steer applications or services from service providers 140 to service subscriber 130 according to one or more service profiles or the service context of the individual subscribers. In this regard, a service profile includes a listing of each of the requirements or policies necessary to provide a particular service or application. Thus, each service profile is comprised of a set of policies, which may be referenced by any number of authorized subscribers, detailing the specific actions or treatments required to provide a service or application. A subscriber context, on the other hand, identifies the services or applications available to that subscriber, by referencing each of the policies required to provide a service or application. If a subscriber is not immediately recognized by communication device 100, at least some embodiments of the present invention contemplate authenticating a subscriber and retrieving the subscriber context and/or service profiles referenced therein from, for example, a central database such as database 120, to deliver the requested services or applications. As one example of a device capable of implementing concepts of the present invention, communication device 100 may include a data switch such as an SGS44000 offered by Ellacoya Networks, Inc., of Merrimack, N.H.

As to the other components of network 10, authentication server 110 may be implemented to configure the applications and processes used to provision information stored in database 120 and to maintain service profiles and subscriber contexts. Furthermore, as will be described below, authentication server 110 may be utilized to forward these service profiles and subscriber contexts from database 120 to communication device 100. Database 120, on the other hand, is utilized to store the information relating to the individual subscribers such as, for example, the application and/or services available to each subscriber (i.e., subscriber contexts). Similarly, database 120 stores information concerning the services and applications (i.e., service profiles) offered by service providers 140. For example, each service provider may offer any number of individual services or applications bundled together as a policy group (i.e., a service bundle). Any changes, modifications, or new implementations to a service bundle or to the contexts of individual subscribers or groups of subscribers may be implemented via authentication server 110, stored to database 120, and later retrieved by communication device 100. For example, revisions may be forwarded and implemented on each of the devices 100 from server 110 via a standard notification process and the like. Although the example depicted in FIG. 1 shows authentication server 110 and database 120 implemented in a single server, the two may just as easily be implemented in distinct locations. Furthermore, any number and combination of components may be utilized to implement the configuring functions of the instant invention including multiple and/or remotely located servers. Also, the configuring function may also be implemented by the subscriber 130 using, for example, self provisioning procedures and the like.

As will be described below, upon authenticating a subscriber, information stored in database 120 may be transmitted to communication device 100. By storing the service policy and subscriber context information on database 120, the information may be manipulated and revised at a central location, thereby promoting mobility and reducing administrative costs. Having the information defined and manipulated in database 120 allows new services and applications to be defined and implemented instantaneously to any number of communication devices 100 or subscribers.

Figure 2:
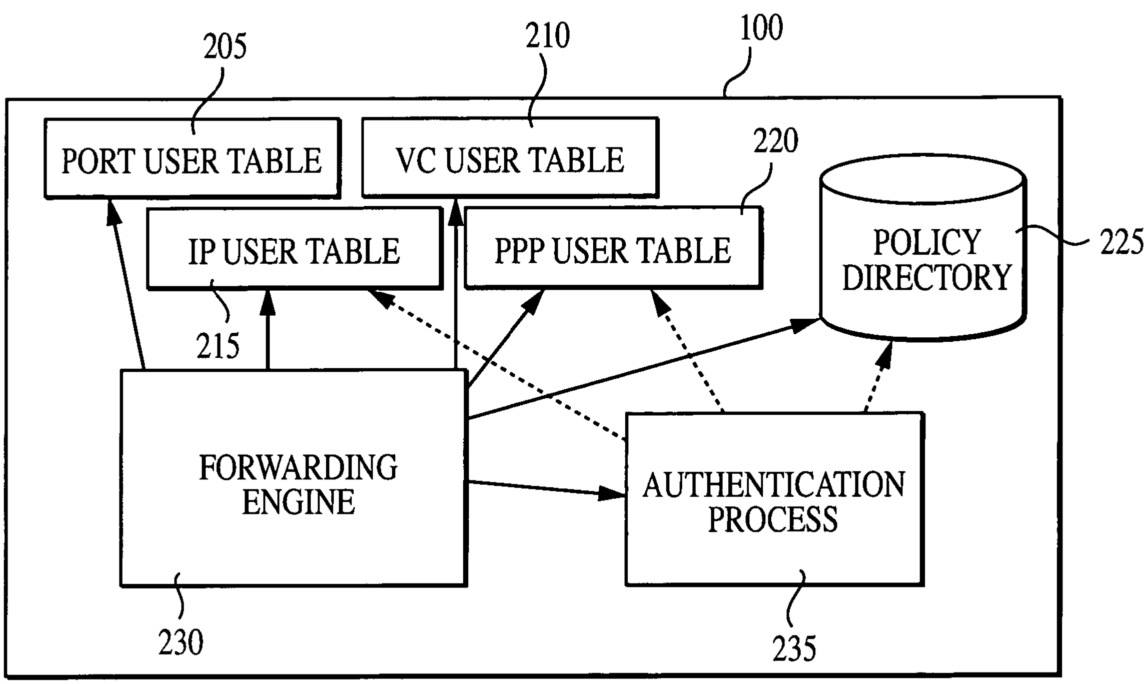
FIG. 2 depicts one example of a communication device utilizable for identifying and authentication subscribers and delivering application and services in conjunction with the network of FIG. 1.

In FIG. 2, subscribers 130 collectively comprise any number of devices (and their users) utilizable to connect to service providers 140, via communication device 100. The devices may include for example personal computers, wireless portable handheld computers or personal digital assistants, two-way pagers, digital telephones, or any other similar device capable of interfacing with device 100 and service providers 140. To connect subscribers 130 with service providers 140, any type of communication network may be utilized. For example, the network may constitute one or more shared data buses or links, point-to-point dedicated dial-up connections, private networks, broadband networks such as cable lines, and any other analogous or similar connections or network(s). Similarly, the devices may be connected via ISDN lines, T1 connections, ATM virtual channels or the like, using any suitable or analogous technologies and protocols including Multipoint Multichannel Distribution Service (MMDS), Digital Subscriber Line (DSL), Asynchronous Digital Subscriber Line (ADSL), satellite service, and/or the like.

Service providers 140 typically include web servers arranged to provide one or more applications or services to subscribers 130. Thus, any Internet-available application or service may be provided via service providers 140. For example, one service may include incrementally varying levels of bandwidth provision (e.g., highest speed, intermediate speed, and lowest speed). Another service might include a virus scan or include other physical devices such as external caching servers, encryption appliances, virtual private network (VPN) tunnels, next-hop gateways, or portals. Also, services and applications may be enabled by time-of-day (e.g., with higher billing rates during business hours). Likewise, rate limiting services (i.e., limiting the bandwidth available to a subscriber) may also be provided. For example, standard Internet access services may be associated with a rate of 512 Kbs while a network backup application may have a rate of 2 Mbs. Yet another possible service includes access control services. In these instances, a subscriber may be prevented from accesses another subscriber's computing device or server. Thus, each of the requirements necessary to effect a service or application is defined by that service's or application's service profile. In this manner, service providers may be able to charge varying rates depending on the level of service requested by a subscriber.

Referring to FIG. 2, communication device 100 stores information relating to the services and applications available to individual subscribers and groups of subscribers (i.e., a subscriber context). Specifically (as will also be discussed below), each subscriber context references a set of service profiles available to the subscriber. In this manner the specifics of the service policy need not be stored with each subscriber context. References to the policies, from any number of authorized subscribers, may subsequently be resolved by examining the service profile. Thus, at least some embodiments of the present invention contemplate that one service profile may be used to describe a service or application accessible to any number of subscribers.

At least some embodiments of the present invention contemplate that device 100 may be used to dynamically steer packets or frames to a particular service provider based on the context of an associated subscriber and a service profile of a requested service or application. Specifically, if a subscriber is recognized, the information used to steer to a particular service provider is determined by subscriber context and service policies cached on device 100. Alternatively, the context and policies may be transmitted from database 120 after authentication and subsequently cached on device 100. A subscriber context references one or more policies available to the subscriber. The polices then dictate the specifics or requirements necessary to provision the particular service or application (i.e., a treatment for a packet). Thus, subscriber traffic may be directed to a destination based on service policies and subscriber context.

At least some embodiments of the present invention contemplate that information stored and accessed by device 100 may be utilized to identify the particular services and applications available to individual subscribers. As will be described in greater detail below, subscribers may be identified from information contained in packets transmitted from a subscriber to a service provider. The subscriber's identity may be used to locate a subscriber context stored on device 100. This context identifies all of the services and applications available to the individual subscriber. Thus, upon identifying a subscriber, device 100 may be used to provision and deliver services to the subscriber.

Referring again to FIG. 2, device 100 is depicted as including a number of computing processes and tables, among other components, for implementing certain techniques of the present invention. For example, a port user table 205 may be implemented for use in identifying associations between physical ports on physical interfaces on device 100 with subscriber identifies. In this regard, table 205 may include a list of communications ports and their associated subscribers. Furthermore, the associations stored in table 205 may be manually configured by a network administrator and stored in database 120 before being transmitted to table 205.

Communication device 100 may also include a virtual channel (VC) user table 210, which may be used to map subscriber identities to asynchronous transmission mode (ATM) virtual channels. For example, table 210 may include a list indexed by ATM virtual channel identifiers and/or virtual path numbers and their associated subscribers. Like port user table 205, data stored in table 210 may be configured manually by a network administrator at an external source and subsequently transmitted to table 210.

An Internet protocol (IP) user table 215, made up of a list of subscribers and their IP addresses, may also be implemented on communication device 100. Thus, table 215 may be used to identify subscribers according to their IP addresses. Further, table 215 may be populated dynamically based on, for example, any industry standard web based challenging technique.

Communication device 100 may also include a point-to-point protocol (PPP) user table 220 for storing associations between a subscriber's identification and a PPP session. Generally speaking, these associations are created dynamically based on any industry standard PPP authentication mechanisms. For example, these authentication procedures may be performed with each instance of a PPP session. Then, after the authentication procedure, a subscriber's identity may be established and subsequently associated with a particular session.

Although port user table 205, VC user table 210 are described above as being statically configured by, for example, a network administrator, it is to be understood that other at least some embodiments of the present invention contemplate utilizing dynamically configurable port user and VC user tables as well.

A policy directory 225 may be used to cache locally each of the service profiles associated with the services and applications offered by service providers 140. As will be discussed in greater detail below, once a packet is identified (i.e., associated with a subscriber), services or applications requested by the packet may be compared against subscriber context stored in directory 225 for purposes of identifying matching policies. Subsequently, the matching policies may be delivered according to the specifics as detailed or described by a corresponding service profile.

Communication device 100 may also include a forwarding engine 230. In this regard, engine 230 may be used to implement the identification, retrieval and provisioning processes of the present invention. Similarly, an authentication process 235 may also be implemented on device 100 to effect the authentication process mentioned above. Specifically, the authentication process may be used when a subscriber is not recognized, for example after performing an identification process, by device 100. In these situations, after performing the authentication process the subscriber context is retrieved from database 120, and cached onto device 100. As one example, an authentication process may include responding to a subscriber's packet with a challenge, which prompts the subscriber to manually type in a password and user name.

Figure 3A:
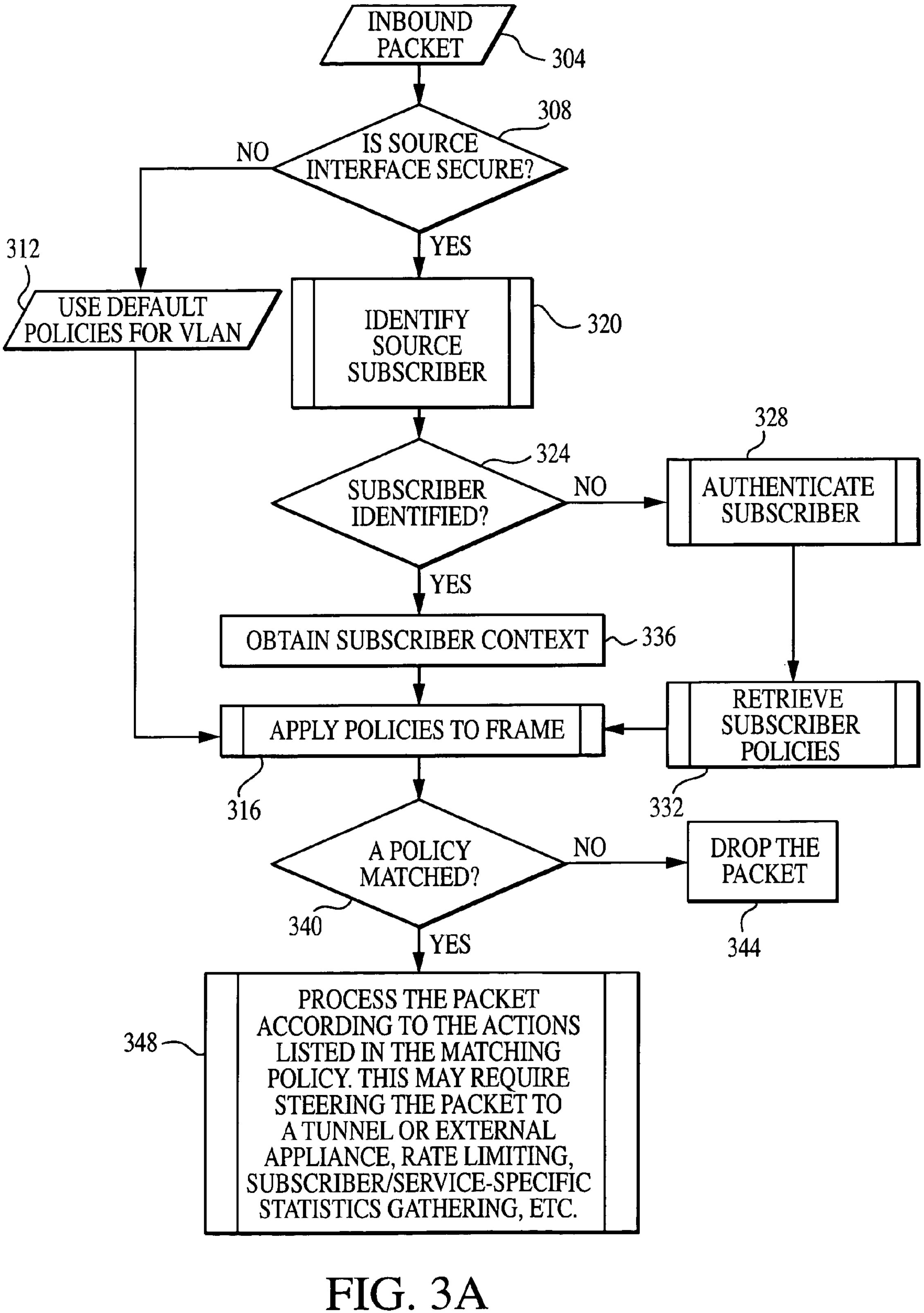
FIG. 3A depicts one example of a high level process utilizable for implementing the identification and steering process of at least some embodiments of the present invention.

One example of a high-level process utilizable for implementing the identification and steering process of the present invention is illustrated in FIG. 3A. Generally speaking, the identification and steering process of FIG. 3A may be utilized to identify the transmitter (i.e., subscriber) of the packet, retrieve subscriber context and/or service profiles if necessary (either internally from device 100 or externally from database 120), and provision services according to the matching policies.

Initially, a packet or frame transmitted from a subscriber device 130 is received by communication device 100 (STEP 304). For example, the packet may comprise a portion of a communication or message transmitted from one of subscribers 130 intended for delivery to a service provider 140. Each packet is examined to identify whether it was received from a secure port or if it originated from a secure interface (STEP 308). Secure interfaces correspond to situations where communications are received from interfaces connected to the subscribers. For example, a secure interface may be used to connect to a private network. In contrast, nonsecure interfaces indicate that the packet was received from a core network, rather than from a subscriber. For example, a nonsecure interface may be used to connect to the Internet.

If the source interface is determined to be nonsecure, default policies for a virtual local area network (VLAN) are utilized (STEP 312). These default policies may be statically configured by, for example, a network administrator and may include, for example, the lowest level of service available, etc. for unsecure ports or unauthenticated subscribers. If the source interface is secure, the subscriber is identified dynamically utilizing the identification and challenge routines of the present invention (STEP 320), as will be discussed in greater detail below with reference to FIG. 4.

The identification process (as will be described below) is used to identify the subscribers recognized by communication device 100, using a hierarchical scheme (STEP 324). For example, the process first attempts to identify a subscriber using an IP identification routine, which determines if there is an established relationship between the subscriber and the source IP address of a received packet. If the process is unsuccessful in identifying using the IP routine, processing shifts to other identification routines including, for example, PPP, ATM, and physical interface identification routines to identify the subscriber. In addition, although PPP, ATM and physical interface mechanisms are provided as specific examples in the embodiment of FIG. 4, it is to be understood that other identification mechanisms may be implemented with the procedure of the present invention. For instance, techniques utilizing Frame Relay (FR), Data Link Connection Identifier (DLCI), Multiprotocol Label Switch (MPLS) path, or Synchronous Optical Network (SONET) channel techniques may also be utilized to identify a subscriber. In any of these routines, if a subscriber is not recognized, communication device 100 executes an authentication process, which as discussed above may include any standard handshaking or password/username challenge to identify the subscriber (STEP 328). After authentication, the subscriber context is retrieved from, for example, database 120 to communication device 100 (STEP 332).

Returning to STEP 324, if the subscriber is identified or recognized by device 100 (i.e., the subscriber is listed in one of tables 205, 210, 215 or 220), the subscriber context corresponding to the identified subscriber is obtained from, for example policy directory 225 (STEP 336). Furthermore, it should be noted that the context information may be stored locally on device 100 or remotely on, for example an external database.

As will be discussed in greater detail below with reference to FIG. 5, once the subscriber context has been retrieved, the policies referenced therein may be applied to the subscriber's packet (STEP 316). Specifically, if a policy referenced by the subscriber context matches the services or applications requested by the packet (STEP 340), the packet is processed according to the actions listed in the corresponding service profile (STEP 348). As will be discussed in greater detail below with reference to FIG. 7, the actions may include, for example, steering the packet to a tunnel or external appliance, application of a rate limiting feature, a subscriber or service specific statistics gathering process, and the like. If the referenced policies do not match the services or applications requested by the packet (STEP 340), the packet is dropped (STEP 344). Thus, at least some embodiments of the present invention contemplate steering or directing traffic (i.e., the subscriber packets) based on subscriber context and service profiles, rather than according to the forwarding tables of device 100.

In addition to policies indicating the types or levels of services available to a particular source subscriber (i.e., outbound policies), policies may also be implemented that dictate the specific subscribers or groups of subscribers that may access a particular destination service provider or a destination subscriber (i.e., inbound policy). For example, a first or source subscriber context may reference an outbound policy that permits communication with all other subscribers or service providers. However, a second subscriber context may reference an inbound policy that permits packets to be received only from a certain group of subscribers. In this situation, a packet from the first subscriber will be delivered only if the second or destination subscriber's inbound policy allows access to the first subscriber. In this manner, the present invention may be utilized to protect against intrusions from unauthenticated subscribers (e.g., Denial of Service attacks, etc).

Figures 1, 3B:
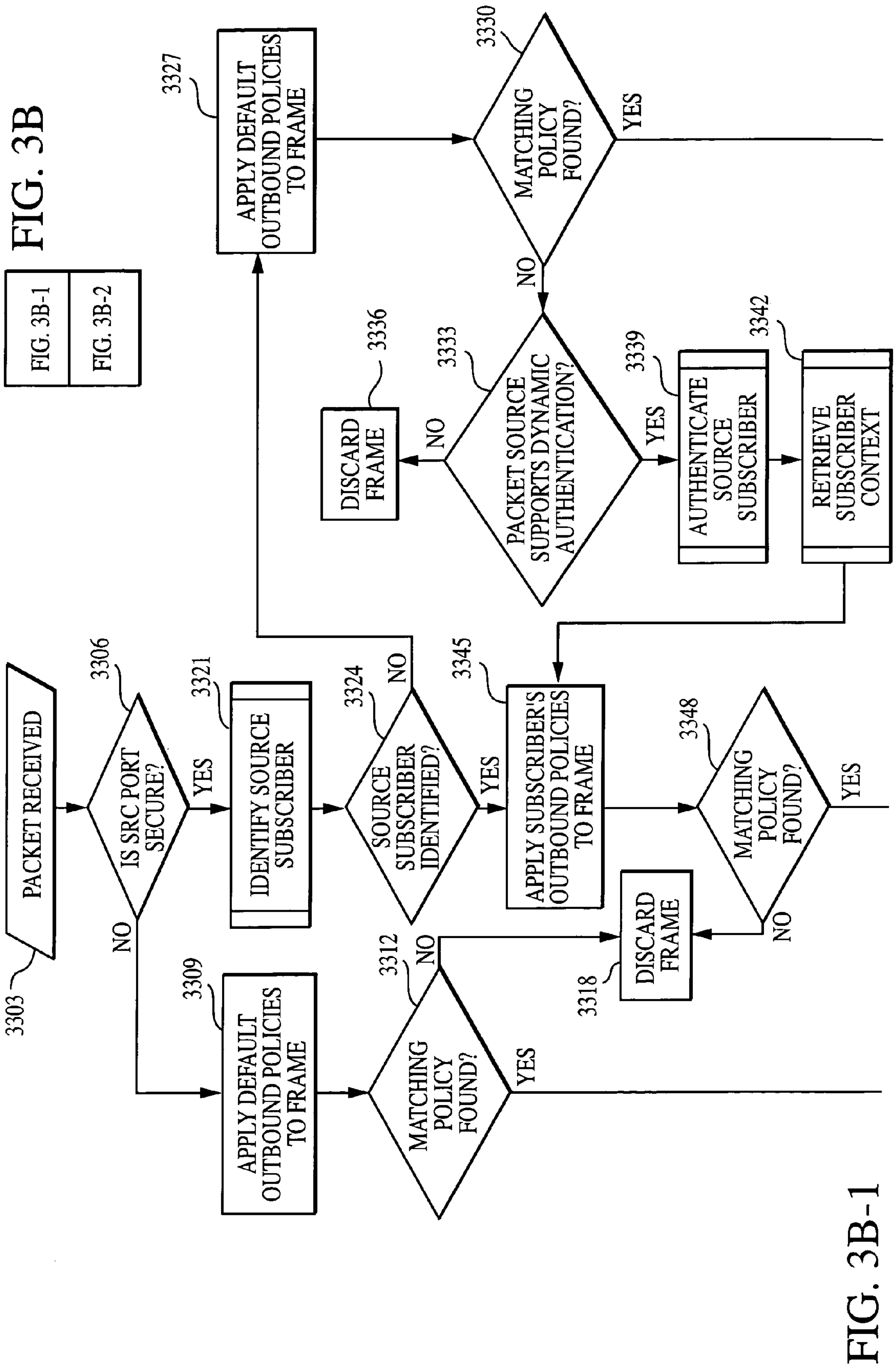
FIG. 3B depicts another example of a high level process utilizable for implementing the identification and steering process of the present invention in conjunction with inbound and outbound policies.
Figures 2, 3B:
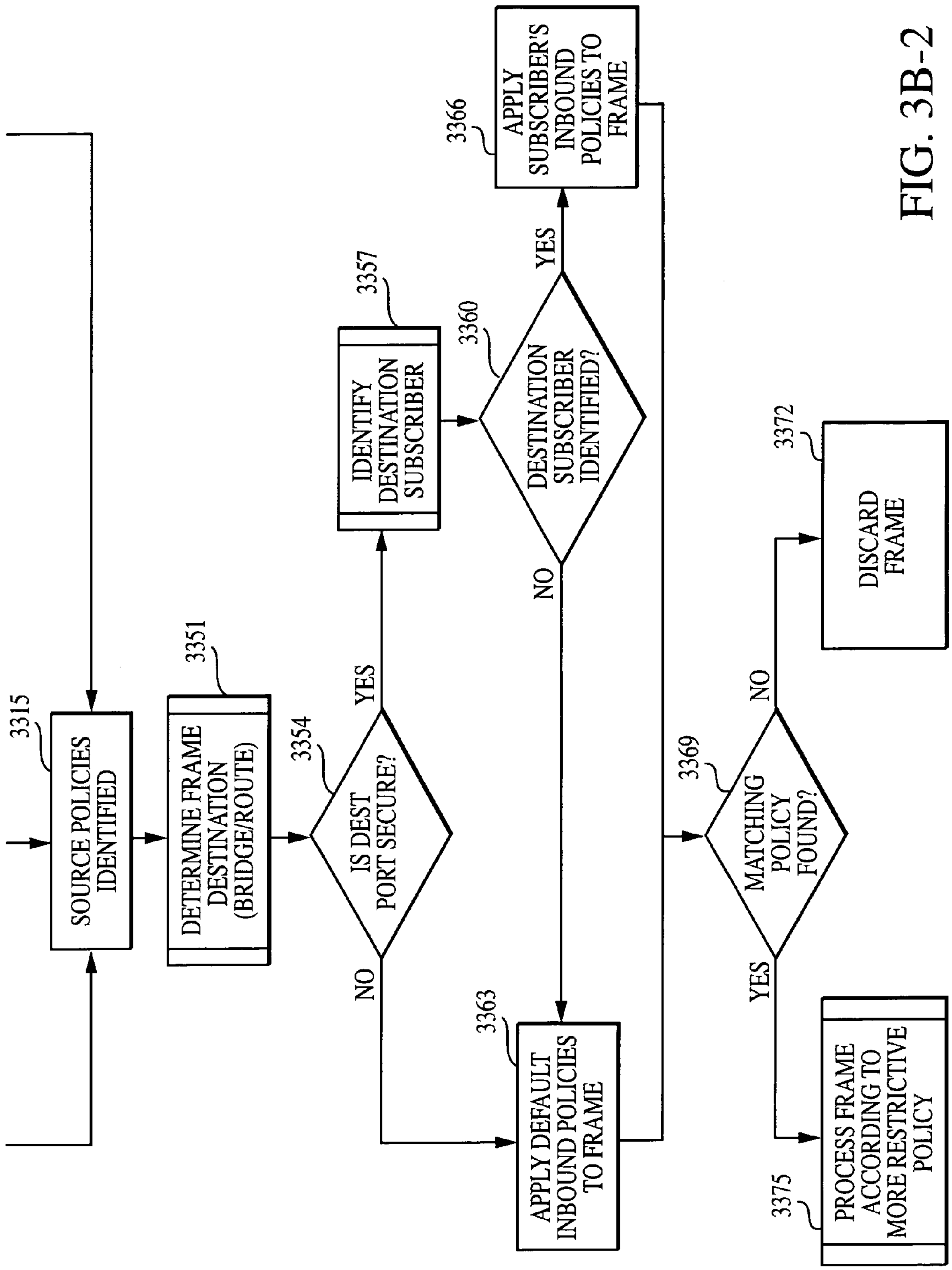

One example of a high-level process utilizable for implementing the identification and steering process with inbound and outbound policies is illustrated in FIG. 3B. As with the example of FIG. 3A, the identification and steering process of FIG. 3B may be utilized to identify the transmitter (i.e., subscriber) of the packet, retrieve referenced inbound and outbound policies (either internally from device 100 or externally from database 120), and provision services according to matching policies.

Initially, a packet or frame transmitted from a subscriber device 130 is received by communication device 100 (STEP 3303). Each packet is examined to identify whether it was received from a secure port or if it originated from a secure interface (STEP 3306). Again, secure interfaces correspond to situations where communications are received from interfaces connected to the subscribers. In contrast, nonsecure interfaces indicate that the packet was received from a core network, rather than from a subscriber.

If the source interface is determined to be nonsecure, communication device 100 attempts to use default outbound policies (STEP 3309). If default outbound polices are located (STEP 3312), they are applied to the packet (STEP 3315). These default outbound policies may be statically configured by, for example, a network administrator and may include, for example, the lowest level of service available, etc for nonsecure ports or unauthenticated subscribers. If default outbound policies are not located (STEP 3312), the frame is discarded (STEP 3318).

If the source interface is secure, the subscriber is identified dynamically utilizing the identification and challenge routines of the present invention (STEP 3321), as will be discussed in greater detail below with reference to FIG. 4. Again, the identification process is used to identify the subscribers recognized by communication device 100, using a hierarchical scheme (STEP 3324). For example, the process first attempts to identify a subscriber using an IP identification routine, which determines if there is an established relationship between the subscriber and the source IP address of a received packet. If the process is unsuccessful in identifying using the IP routine, processing shifts to other identification routines including, for example, PPP, ATM, and physical interface identification routines to identify the subscriber. In addition, although PPP, ATM and physical interface mechanisms are provided as specific examples in the embodiment of FIG. 4, it is to be understood that other identification mechanisms may be implemented with the procedure of the present invention. For instance, techniques utilizing Frame Relay (FR), Data Link Connection Identifier (DLCI), Multiprotocol Label Switch (MPLS) path, or Synchronous Optical Network (SONET) channel techniques may also be utilized to identify a subscriber.

In any of these routines, if a subscriber is not recognized, communication device 100 attempts to apply default outbound policies to the frame (STEP 3327). If default outbound polices are located (STEP 3330), they are applied to the packet (STEP 3315). If default outbound policies are not located (STEP 3312), communication device 100 attempts executing an authentication process to identify the subscriber. If the packet source (or subscriber 130) does not support dynamic authentication (STEP 3333), the frame is discarded (STEP 3336). If the packet source (or subscriber 130) supports dynamic authentication (STEP 3333), the subscriber is authenticated using any of the examples described above or any standard industry authentication process (STEP 3339). After authentication, the subscriber context referencing the outbound policies are retrieved from, for example, database 120 to communication device 100 (STEP 3342).

Returning to STEP 3324, if the subscriber is identified by device 100 (i.e., the subscriber is listed in one of tables 205, 210, 215 or 220), or if the subscriber context referencing the outbound policies has been retrieved after authentication, communication device 100 stores the outbound policies for application to the packet (STEP 3345). Subsequently, communication device 100 attempts to match the outbound policies to the packet (STEP 3348). As will be described below with reference to FIG. 5, the services or applications requested by the subscriber's packet are compared with outbound policies available to the subscriber to identify matches. If a match is identified, the outbound policies are identified as being applicable to the packet (STEP 3315).

Subsequently, communication device 100 executes a bridging or routing procedure for transmitting or forwarding the subscriber's packet (STEP 3351). In this regard, any industry standard process may be utilized.

From there, communication device 100 determines whether the destination port is secure (STEP 3354). If the destination port is a secure port, the destination subscriber is identified using the process described in FIG. 4 (STEP 3357). If the destination subscriber is not recognized by communication device 100, or if the destination port is not secure, default inbound policies are applied to the packet (STEP 3363).

If the destination subscriber is identified, the destination subscriber context referencing inbound policies are retrieved (e.g., using the process described in FIG. 5) and applied (STEP 3366). Or, if the destination subscriber is not recognized by communication device 100, default inbound policies are applied to the packet (STEP 3363).

Once communication device 100 has identified the inbound policies to be applied, it then attempts to match the inbound policies to the packet (STEP 3369). As will be described below with reference to FIG. 5, the services or applications requested by the subscriber's packet are compared with inbound policies of the destination subscriber. If a match is identified, the more restrictive of the inbound and outbound policies are applied (STEP 3375). For example, with rate limiting services, the lower rate specified by the inbound and outbound policies is utilized. If a match is not identified, the packet is dropped (step 3372).

Figure 4:
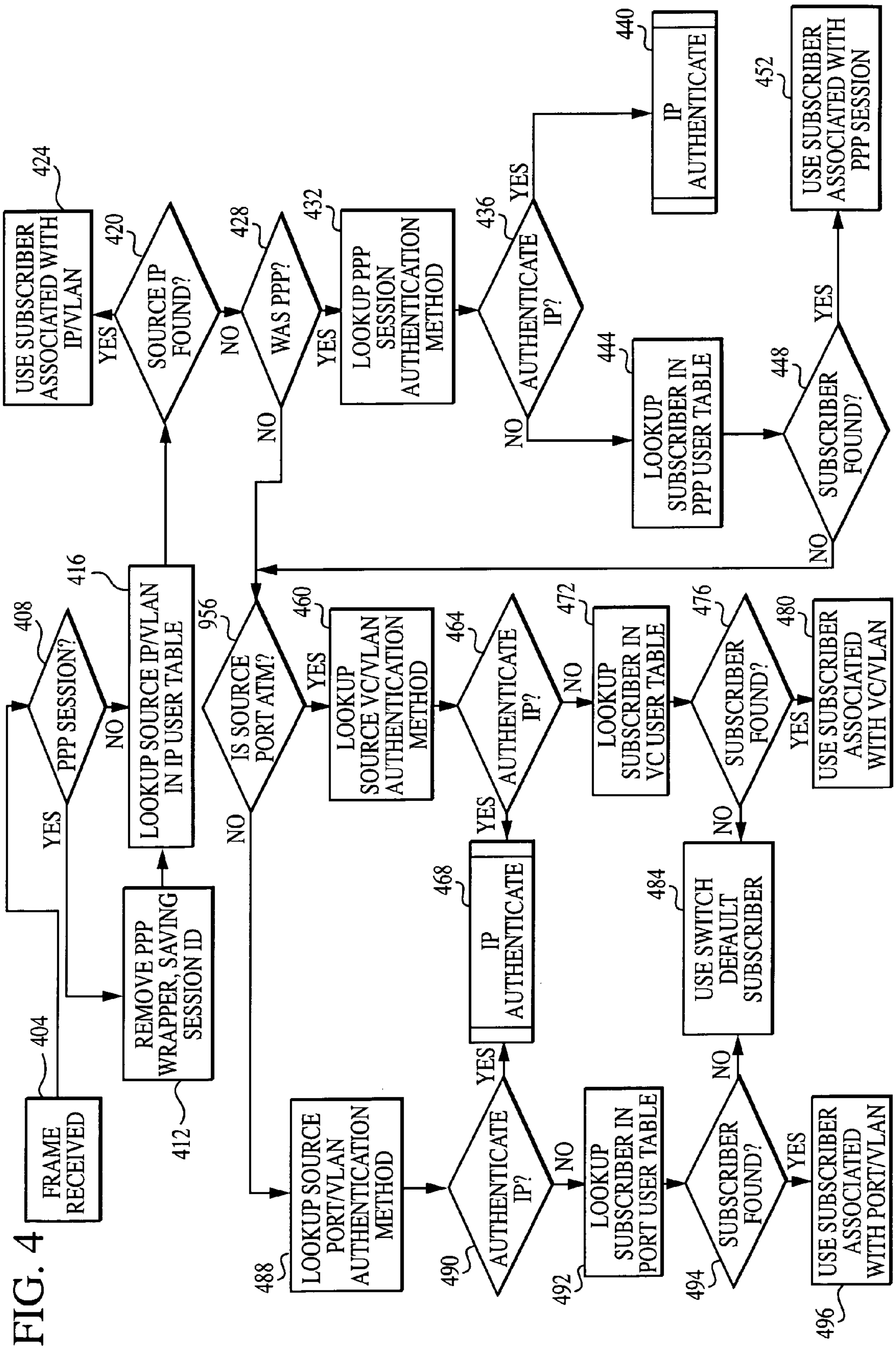
FIG. 4 depicts one example of a process utilizable for identifying a subscriber.

FIG. 4 illustrates one example of a process utilized to identify the subscriber from which a packet originated. Generally speaking, the identification process of FIG. 4 may be utilized to identify the transmitter (i.e., subscriber) of the packet by comparing fields included with the packet against directory information corresponding to a packet source (i.e., packet source information). Specifically, as will be discussed below, the directory information corresponds generally to the type of interface from which the packet was received. For example, packets may originate from a PPP session, ATM virtual channels, physical interfaces such as ethernet-type ports, VLAN ports and the like. Furthermore, it is to be understood that other types of packet sources may also be utilized including, for example, VLAN, FDDI, token rings, etc. Thus, the identification process basically maps a packet to a subscriber using the above noted packet source information.

Initially, a packet is received by communication device 100 for processing (STEP 404). Subsequently, the packet is examined to determine whether it entered communication device 100 via a PPP session (STEP 408). As mentioned above, a PPP session simulates a single point-to-point link between two devices allowing an authentication protocol to identify the packet source and authorize the transmission. At least some embodiments of the present invention contemplate utilizing any standard PPP authentication method to identify the subscriber.

If the packet was not received during a PPP session, the process attempts to look up the subscriber using a source IP address of the packet in IP user table 215 (STEP 416) (virtual local area network (VLAN) tags may also be used to further index or distinguish between IP addresses).

If the packet was received during a PPP session, a PPP wrapper is first removed, after which a session ID is saved (STEP 412). From there, device 100 attempts to look up the IP address of the packet (STEP 416). Specifically, if a source IP address is recognized (STEP 420), that is, if the source IP address (and optionally a VLAN tag) of the packet matches a subscriber listed in table 215, the policies associated with subscriber listed in IP user table 215 (as determined according to the subscriber context) are utilized (STEP 424).

If the source IP address is not recognized, a determination is again made as to whether the packet arrived during a PPP session (STEP 428). If the packet was received during a PPP session, communication device 100 looks up a specified method for authenticating the PPP session subscriber (STEP 432). Although other alternatives are possible, in one example the method to be utilized for authenticating the PPP session subscriber may be specified by, for example, a network administrator.

At least some embodiments of the present invention contemplate using any number of methods for authenticating the source of a packet received during a PPP session. As one example, an entire session may be used to identify the source of such a packet. In these cases, the entire session, with all of its subscribers, is identified together. As another example, the IP address of a packet received during a PPP session may alternatively be used to identify its source. In these cases, each subscriber for each session is identified individually.

If an IP address is to be used to authenticate a subscriber (STEP 436), a separate authentication process is generally utilized to identify the subscriber (because the packet's IP address was not previously recognized in STEP 420). Thus, authentication process 235 may be called (STEP 440). If on the other hand the IP address of the packet is not to be used to authenticate a subscriber, the session ID previously saved in STEP 412 is utilized to look up the subscriber in PPP user table 220 (STEP 444). That is, table 220 is searched for a PPP session ID matching that of the packet. If the session ID is recognized (STEP 448), in other words, if a subscriber is listed in table 220 as being associated with the PPP session of the packet, the policies associated with the subscriber listed in table 220 (as determined according to the subscriber context) are utilized (STEP 452).

If a matching PPP session ID is not found in table 220 (STEP 448), or if the packet did not originate from a PPP session (STEP 428), the packet is examined to determine whether it originated from a port interfaced with an ATM virtual channel (STEP 456). If so, communication device 100 looks up a specified method for authenticating the virtual channel subscriber (STEP 460). Like with the PPP session authentication process described above, the method to be utilized is typically specified by, for example, a network administrator (although other methods are possible).

At least some embodiments of the present invention contemplate using any number of methods for authenticating the source of a packet received during via an ATM virtual channel. As one example, each subscriber may be treated individually, in which case the IP address of a packet received from the ATM virtual channel may be used to identify its source. Alternatively, the virtual channel as a whole (i.e., all of the packets from that virtual channel) may be treated alike. In these cases, all of the subscribers interfaced through that port are identified together.

If an IP address is to be used to authenticate a subscriber (STEP 464), a separate authentication process is generally utilized to identify the subscriber (because the packet's IP address was not previously recognized in STEP 420). Thus, authentication process 235 may be called (STEP 468). If on the other hand an IP address is not to be used to authenticate a subscriber, the virtual channel identifier (VCI) and/or the virtual path identifier (VPI) of the packet are used as a key to look up the subscriber in VC user table 210 (STEP 472). That is, table 210 is searched for a VCI and/or VPI matching that of the packet. If the VCI and/or VPI are recognized (STEP 476), in other words, if a subscriber is listed in table 210 as being associated with VCI and/or VPI of the packet, the policies associated with subscriber listed in table 210 (as determined according to the subscriber context) are utilized (STEP 480). Furthermore, virtual local area network (VLAN) tags may also be used to further index or distinguish between VCIs and/or VPIs.

On the other hand, if the subscriber is not found in table 210, a default profile is utilized (STEP 484). Specifically, default profiles may be statically set by, for example, a network administrator.

Returning to STEP 456, if the packet did not originate from a port interfaced with an ATM virtual channel, the packet will generally have originated from a physical interface such as an ethernet type port or the like. In addition to ethernet type ports, other physical interfaces may be implemented including fiber distributed data interfaces (FDDI) and token ring interfaces. Like the examples discussed above, communication device 100 looks up a specified method for authenticating the subscriber (STEP 488). Again, the method to be utilized is typically specified by, for example, a network administrator (although other examples are possible).

At least some embodiments of the present invention contemplate using any number of methods for authenticating the source of a packet received from a physical port. As one example, each subscriber may be treated individually, in which case the IP address of a packet received may be used to identify its source. Alternatively, any standard industry authentication process may be used.

If an IP address is to be used to authenticate a subscriber (STEP 490), a separate authentication process is generally utilized to identify the subscriber (because the packet's IP address was not previously recognized in STEP 420). Thus, authentication process 235 may be called (STEP 468). If on the other hand an IP address is not to be used to authenticate a subscriber, the physical port number corresponding to the port that received the packet is used to look up the subscriber in port user table 205 (STEP 492). That is, table 205 is searched for a physical port number (through which the packet was received) matching that of the packet. If the port number is recognized (STEP 494), in other words, if a subscriber is listed in table 205 as being associated with the physical port number of the packet, the policies associated with subscriber listed in table 205 (as determined according to the subscriber context) are utilized (STEP 496). Furthermore, virtual local area network (VLAN) tags may also be used to index or further distinguish between physical port numbers.

On the other hand, if the subscriber is not found in table 205, a default profile is utilized (STEP 484). Specifically, default profiles may be set by, for example, a network administrator.

Figure 5:
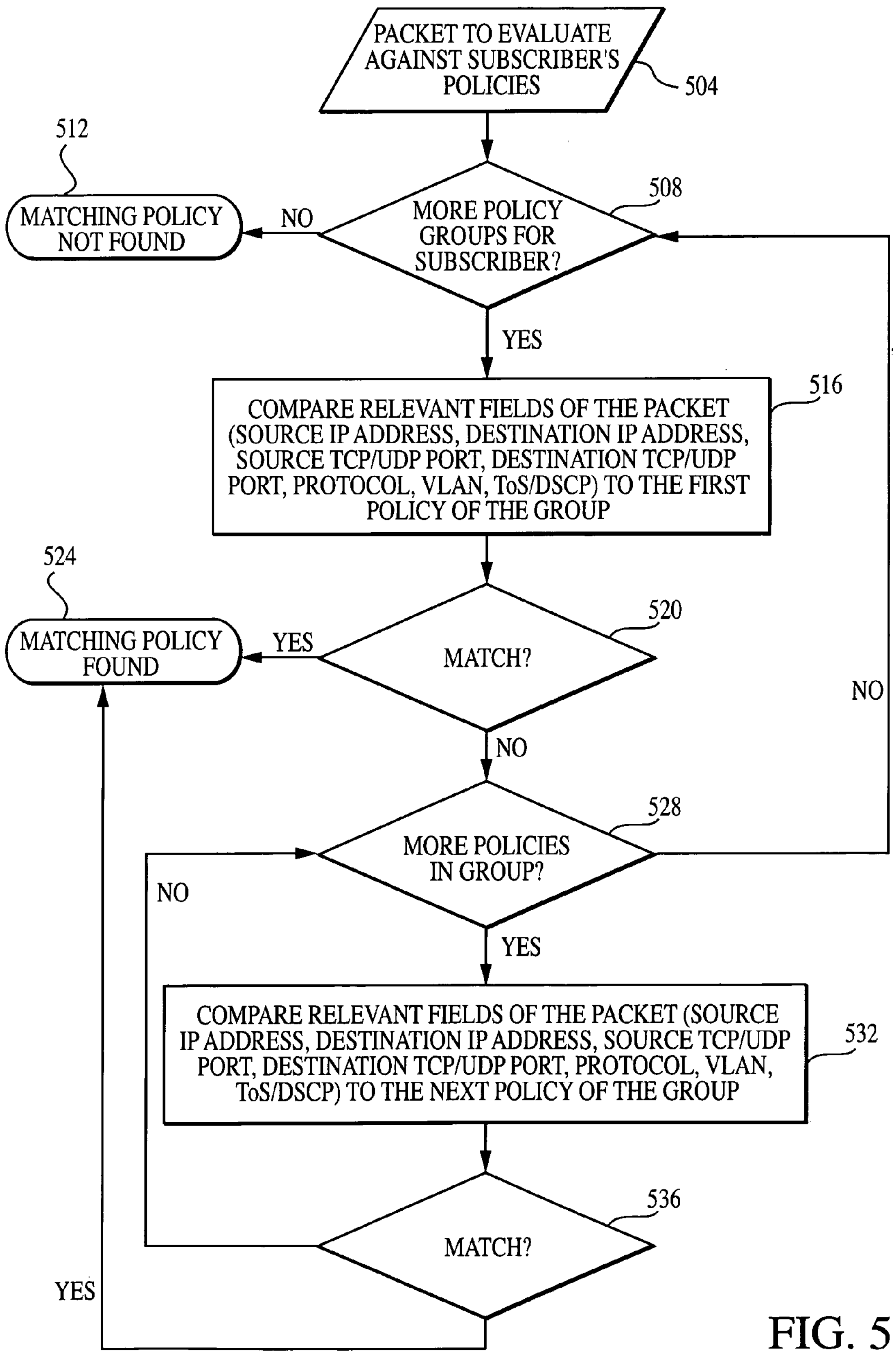
FIG. 5 depicts one example of a process utilizable for identifying a policy to apply to a packet.

FIG. 5 depicts one example of a process used to apply polices to a packet. As mentioned above, once the subscriber's policies have been identified (as determined according to the subscriber context), they may be compared against the specific service or application requested by the packet. Assuming that the policies match (i.e., the service or application requested is referenced by the subscriber context), they may be applied to the subscriber's packet according to the specifics detailed by a corresponding service profile (i.e., the application and/or service may be provisioned).

At least some embodiments of the present invention contemplate that each service profile is comprised of a set of policies, which may be referenced by any number of authorized subscribers. For instance, an IP video application service profile may be defined by a series of different individual policies. There may be a policy that permits a subscriber to communicate with a provisioning video server for purpose of selecting a movie. There may be a policy that authorizes the transmission of the video stream back to the subscriber; and there may be a policy that that allows the transmission of an acknowledgment packet back to the video server. Thus, these three policies are grouped together or bundled into a policy group to form the IP video application, and subsequently referenced with each request for the application.

At least some embodiments of the invention contemplate that the context of each subscriber will point to or reference each of the policies authorized to be received. For instance, the service context of a subscriber includes the uniquely tailored set of policies, which make up the services or applications available to the subscriber. The policies define the service definitions available to a subscriber, rate limits (e.g., ceiling on available bandwidth), time-of-day limitations, and the like. Thus, the context of each of the subscribers authorized to receive the above-described exemplary video IP application would include a reference to each of the three policies making up the video IP application service profile. Accordingly, each subscriber is associated with any number of policy groups or individual policies, each of which is authorized for use by the subscriber.

Referring again to FIG. 5, as a starting point, the packet is received and examined (STEP 504). After receiving the subscriber's packet, the policy groups referenced by the subscriber context are examined, one policy group at a time, to identify whether any matches exist (STEP 508). Basically, each of the policies in each of the policy groups referenced by the subscriber context is examined. If no matches are identified, and all of the policy groups referenced by the subscriber context have been examined, the subscriber is not authorized to receive the requested application or service (STEP 512), and the packet is dropped, as described at STEP 344 of FIG. 3A.

However, if policy groups referenced by the subscriber context remain to be examined, at least some embodiments of the present invention contemplate comparing any number of fields of the packet to corresponding fields of a first policy of the policy group to determine whether a match exists (STEP 516). For example, at least some embodiments of the present invention contemplate comparing any individual or combination of source IP address, destination IP address, application port numbers, IP protocols (including UDP, TCP, ICMP (Internet Control Message Protocol), etc.), source and destination TCP/UDP (Transmission Control Protocol/User Datagram Protocol) port fields, VLAN (Virtual Local Area Network) tags or ToS/DSCP (Type of Service/Differentiated Services Code Point) fields, and the like. At least some embodiments of the present invention contemplate that the fields of the policies used to determine matching policies may be set statically by a system administrator, or dynamically to match any number of subscribers. Furthermore, partial matches are also contemplated as being encompassed by the present invention. For example, wildcards or ranges of matches are permitted. To illustrate, a match may exist when only the first two values of an IP address (e.g., 10.10) are identical. Thus, in this example, any values after the second value are not considered. If a match is identified (STEP 520), it may be processed according to the actions listed therein (STEP 348).

If a match is not located after comparing the packet with the first policy of the referenced group, the policy group is examined to identify whether additional policies exist (STEP 528). Again, any number of fields of the packet may be compared with corresponding fields of the policy to determine whether a match exists (STEP 532). If a match exists (STEP 536), it may be processed accordingly (STEP 348). This process continues until each of the polices within each referenced policy group for the subscriber has been examined, or until a match is identified (STEP 524).

Figure 6:
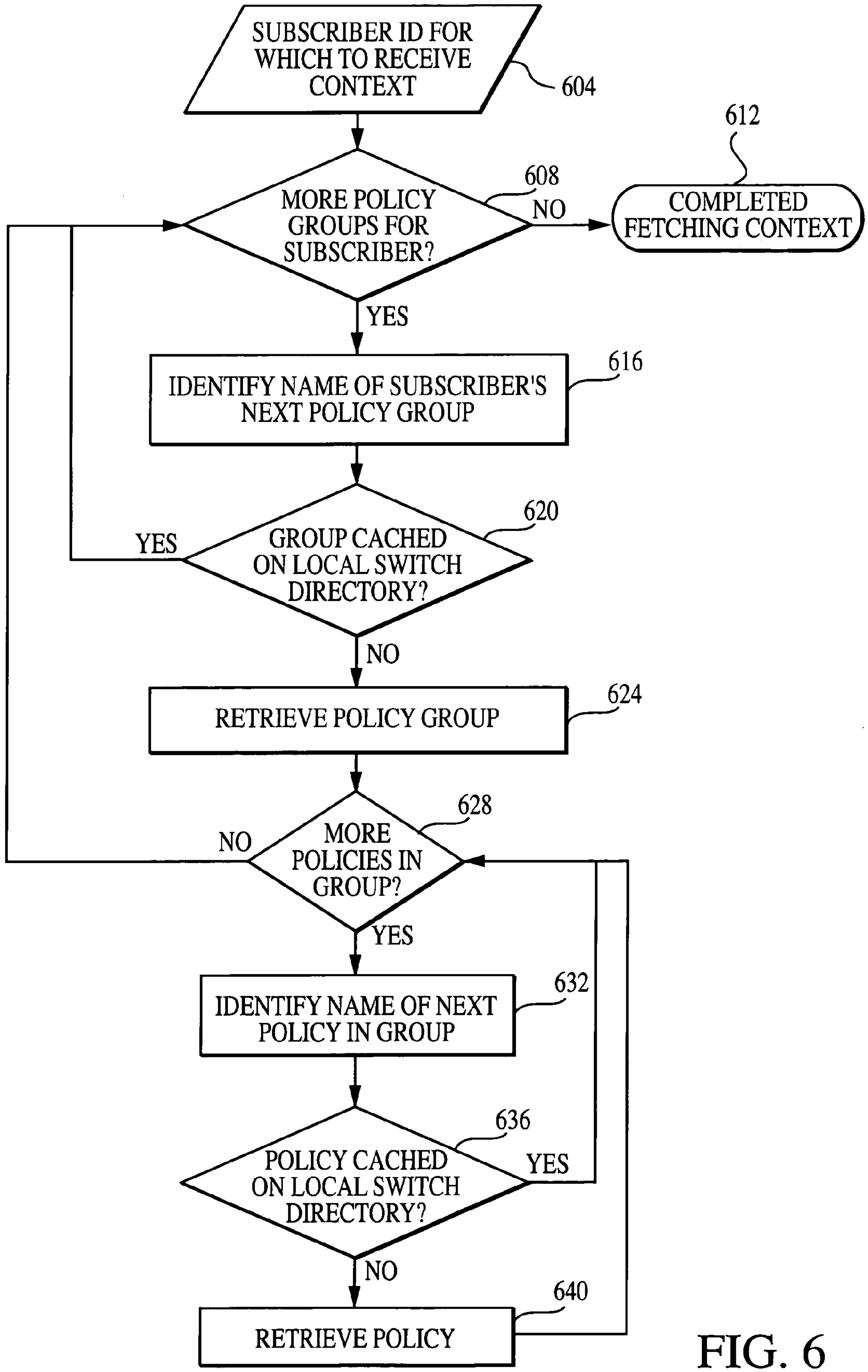
FIG. 6 depicts one example of a process utilizable to retrieve a subscriber's service context.

FIG. 6 illustrates one example of a process utilizable to retrieve a subscriber context. As mentioned above, after authenticating a subscriber (STEP 328), at least some embodiments of the present invention contemplate retrieving subscriber context for a particular subscriber so that communication device 100 may provision services or applications to the subscriber. Generally speaking, each of the policy groups stored for example in database 120 is examined for a subscriber ID (i.e., a reference to a subscriber) corresponding to the subscriber. If a policy group that references the subscriber is identified, that policy group is forwarded to communication device 100.

Initially, the subscriber ID is received by, for example, database 120, for which communication device 100 requires policy information (STEP 604). The subscriber ID is used to identify all of the policy groups associated with that particular subscriber (STEP 608). If no policy groups include the subscriber ID, the retrieving process ends (STEP 612). If policy groups referencing the subscriber remain to be examined, the name of the policy group is identified and compared with the groups stored in, for example, directory 225 (STEP 616).

Any policy groups recognized by communication device 100 (i.e., groups that are already stored in directory 225) (STEP 620), are already cached in directory 225, and are therefore not retrieved. In these cases, processing continues with an examination of the next policy group (STEP 608). However, if the policy group is not recognized by communication device 225, that policy group is retrieved to allow each policy within the group to be examined (STEP 624). For each policy in the group, the name of the policy is identified (STEP 632) and compared with the policies cached in directory 225 of device 100 (STEP 636). If the retrieved policy is recognized by device 100, processing continues with the next policy in the group. However, if the policy is not recognized, that policy is retrieved and cached in directory 225 (STEP 640) to effect provisioning of services and applications to the subscriber. This procedure continues until all of the policy groups, and policies associated therewith, have been examined (STEP 628). Furthermore, policy information may be cached locally on device 100 or remotely on an external database or the like. Thus, policies that have already been cached are not retrieved. In this manner, the present invention provides the ability to dynamically forward individualized subscriber context and group profiles upon authentication.

Figure 7:
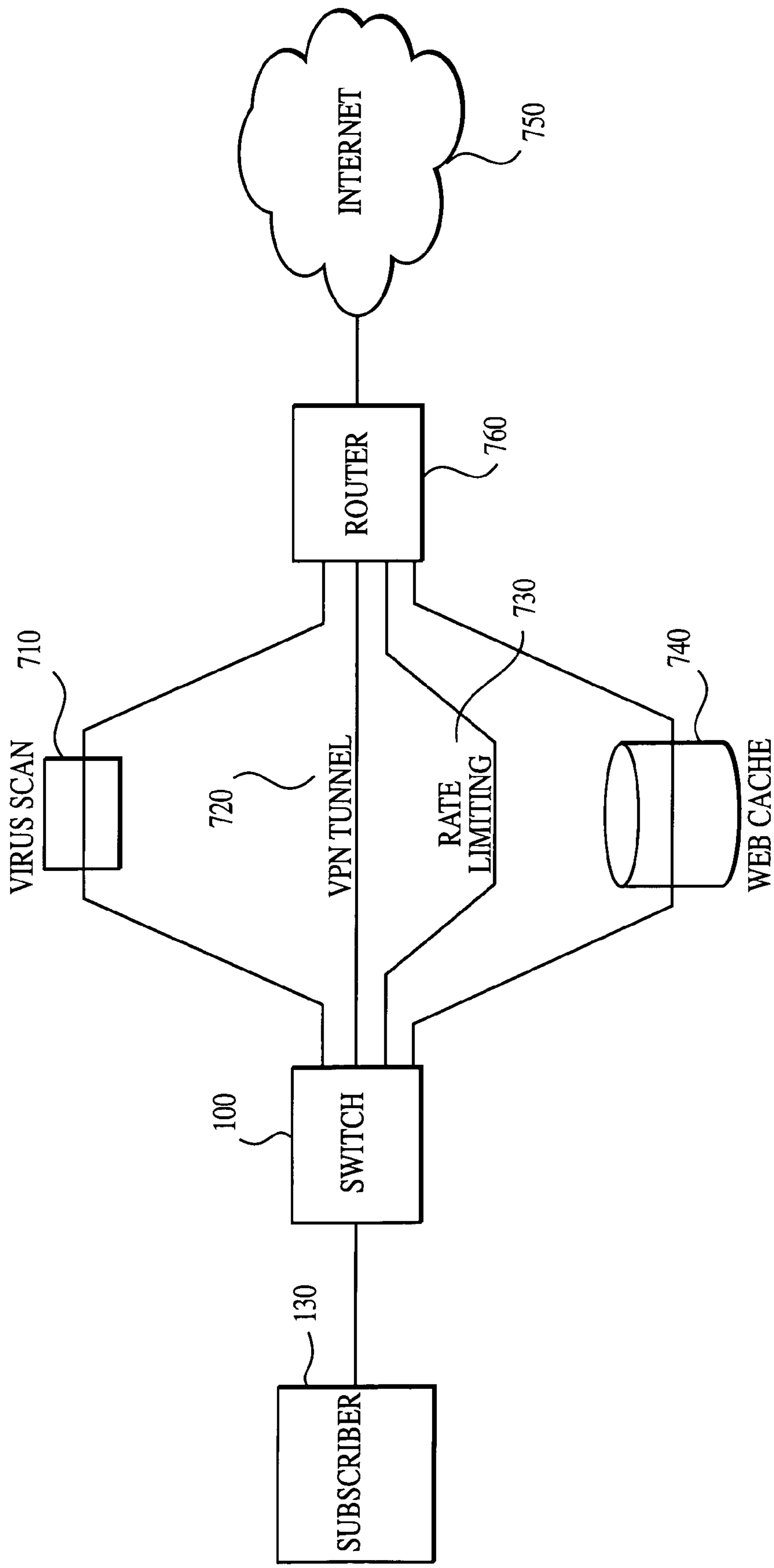
FIG. 7 illustrates the provisioning of a number of services and applications to a subscriber using techniques of at least some embodiments of the present invention.

FIG. 7 illustrates one example of a number of services and applications being provisioned to a subscriber using techniques of the present invention. In FIG. 7, service and application requests are transmitted via packets from subscriber 130 to communication device 100. Utilizing the above-described methods and procedures, communication device 100 identifies the subscriber and attempts to locate the subscriber context. Once the subscriber context has been located, device 100 confirms that a match exists between the service or application requested and the authorized services or applications. From there, the requested services or applications are delivered from service providers 140 via, for example, the Internet 750 through public communication device 760 and device 100 to subscriber 130. As discussed above, any number of services and/or applications may be provisioned, including, for example, virus scans 710, virtual private network tunnels 720, rate limiting services 730, web caches 740, etc.

Figure 8:
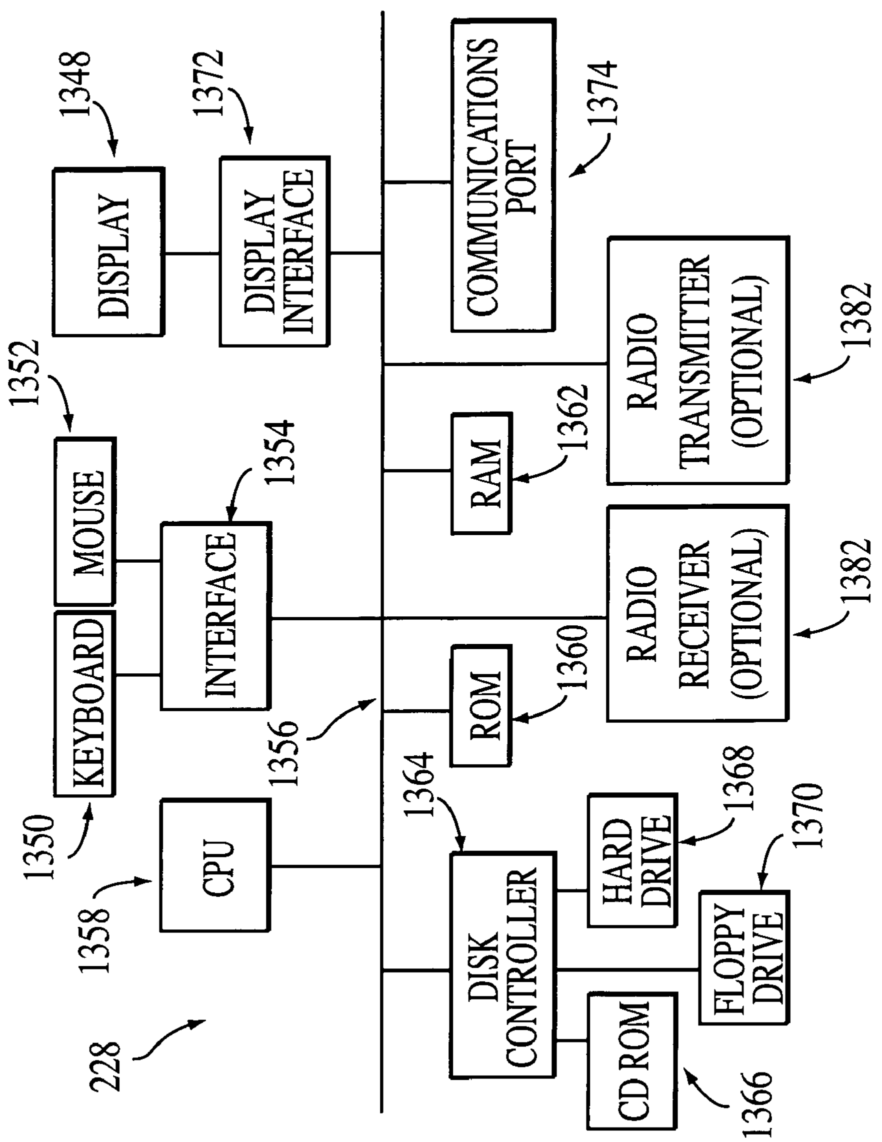
FIG. 8 is a high-level block diagram depicting aspects of computing devices contemplated as part of, and for use with, at least some embodiments of the present invention.

FIG. 8 illustrates a block diagram of one example of the internal hardware of a subscriber device 130, a service provider device 140, and/or communication device 100. A bus 1356 serves as the main information link interconnecting the other components of system 115. CPU 1358 is the central processing unit of the system, performing calculations and logic operations required to execute the processes of the instant invention as well as other programs. Read only memory (ROM) 1360 and random access memory (RAM) 1362 constitute the main memory of the system. Disk controller 1364 interfaces one or more disk drives to the system bus 1356. These disk drives are, for example, floppy disk drives 1370, or CD ROM or DVD (digital video disks) drives 1366, or internal or external hard drives 1368. CPU 1358 can be any number of different types of processors, including those manufactured by Intel Corporation or Motorola of Schaumberg, Ill. The memory/storage devices can be any number of different types of memory devices such as DRAM and SRAM as well as various types of storage devices, including magnetic and optical media. Furthermore, the memory/storage devices can also take the form of a transmission.

A display interface 1372 interfaces display 1348 and permits information from the bus 1356 to be displayed on display 1348. Display 1348 is also an optional accessory. Communications with external devices such as the other components of the system described above, occur utilizing, for example, communication port 1374. For example, port 1374 may be interfaced with a bus/network linked to CMP device 20. Optical fibers and/or electrical cables and/or conductors and/or optical communication (e.g., infrared, and the like) and/or wireless communication (e.g., radio frequency (RF), and the like) can be used as the transport medium between the external devices and communication port 1374. Peripheral interface 1354 interfaces the keyboard 1350 and mouse 1352, permitting input data to be transmitted to bus 1356. In addition to these components, the control system also optionally includes an infrared transmitter 1378 and/or infrared receiver 1376. Infrared transmitters are optionally utilized when the computer system is used in conjunction with one or more of the processing components/stations that transmits/receives data via infrared signal transmission. Instead of utilizing an infrared transmitter or infrared receiver, the control system may also optionally use a low power radio transmitter 1380 and/or a low power radio receiver 1382. The low power radio transmitter transmits the signal for reception by components of the production process, and receives signals from the components via the low power radio receiver.

Figure 9:
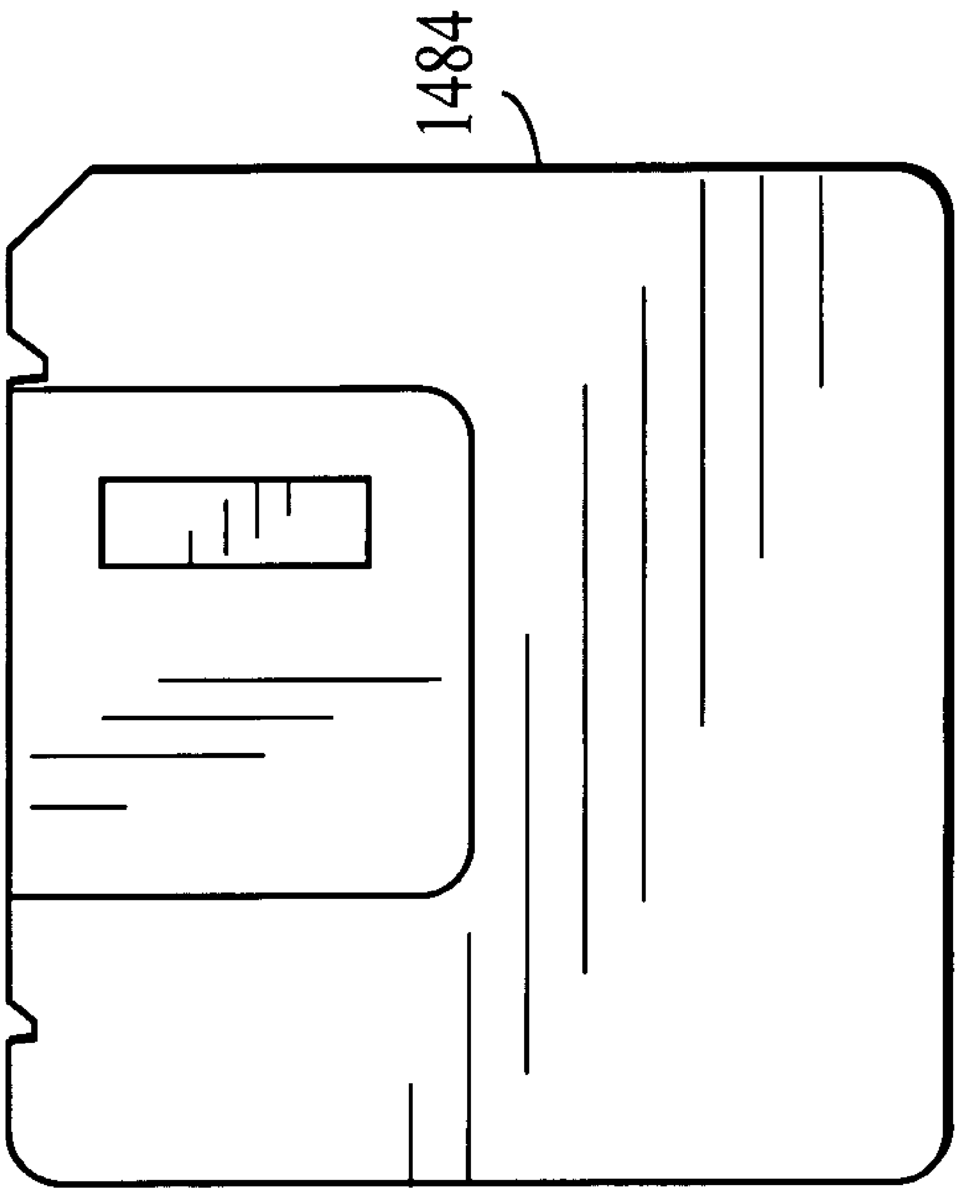
FIG. 9 illustrates one example of a memory medium which may be used for storing a computer implemented process of at least some embodiments of the present invention.

FIG. 9 is an illustration of an exemplary computer readable memory medium 1484 utilizable for storing computer readable code or instructions. As one example, medium 1484 may be used with disk drives illustrated in FIG. 8. Typically, memory media such as floppy disks, or a CD ROM, or a digital video disk will contain, for example, a multi-byte locale for a single byte language and the program information for controlling the above system to enable the computer to perform the functions described herein. Alternatively, ROM 1360 and/or RAM 1362 can also be used to store the program information that is used to instruct the central processing unit 1358 to perform the operations associated with the instant processes. Other examples of suitable computer readable media for storing information include magnetic, electronic, or optical (including holographic) storage, some combination thereof, etc.

At least some embodiments of the present invention contemplate that various portions of software for implementing the various aspects of the present invention as previously described can reside in the memory/storage devices.

In general, it should be emphasized that the various components of at least some embodiments of the present invention can be implemented in hardware, software, or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using C or C++ programming languages.

It is also to be appreciated and understood that the specific embodiments of the invention described hereinbefore are merely illustrative of the general principles of the invention. Various modifications may be made by those skilled in the art consistent with the principles set forth hereinbefore.

We claim:

1. A method of delivering an application or service to a subscriber, said method comprising the steps of:

(1) receiving a packet requesting delivery of said application or service from said subscriber at a communication device;

(2) retrieving, after said step (1), a subscriber context referencing policies that describe applications and services available to said subscriber;

(3) comparing said application or service requested by said packet with policies referenced by said subscriber context to identify matching policies;

(4) referencing a service policy accessible for describing said application or service when requested by other subscribers to obtain a description of said matching policies; and (5) delivering said requested application or service from a service provider to said subscriber via said communication device according to said description of said matching policies obtained from a service profile.

2. The method of claim 1, wherein each application or service is described by a single set of policies in said service profile, and wherein each request for said application or service is fulfilled according to said single set of policies.

3. A method of delivering applications or services via a communication device in communication with a service provider and a subscriber, said method comprising the steps of:

(1) receiving a packet at said communication device from said subscriber;

(2) obtaining a subscriber context referencing policies that references applications or services available to said subscriber by attempting to identify said subscriber, and authenticating said subscriber when said subscriber is not identified;

upon identifying or authenticating said subscriber, performing the steps of:

(3) comparing said subscriber context with said packet; and (4) delivering one or more applications or services requested by said packet that are also referenced by said subscriber context from said service provider through said communication device to said subscriber.

4. The method of claim 3, wherein said step of obtaining a subscriber context further comprises comparing said packet with packet source information accessible by said communication device.

5. The method of claim 3, wherein said step of authenticating further comprises the step of dynamically retrieving said subscriber context from an off communication device data store.

6. The method of claim 3, wherein said packet source information comprises identifiers for identifying an interface through which said packet was received.

7. The method of claim 6, wherein said identifiers comprise at least one of: an IP address; a PPP session number;

an ATM VCI or VPI; a physical interface number; or a VLAN tag.

8. The method of claim 3, wherein said comparing comprises comparing packet fields of said packet and of said subscriber context.

9. The method of claim 8, wherein said packet fields comprise at least one of: a source or destination IP address; a source or destination TCP/UDP port number; VLAN tag; or ToS/DSCP.

10. The method of claim 3, wherein services and applications are delivered according to inbound and outbound policies, and wherein a least restrictive policy is applied.

* * * * *